Dec. 17, 1963    S. L. JACOFF    3,114,402
SAW BLADE HOLDING MECHANISM
Filed Dec. 18, 1961
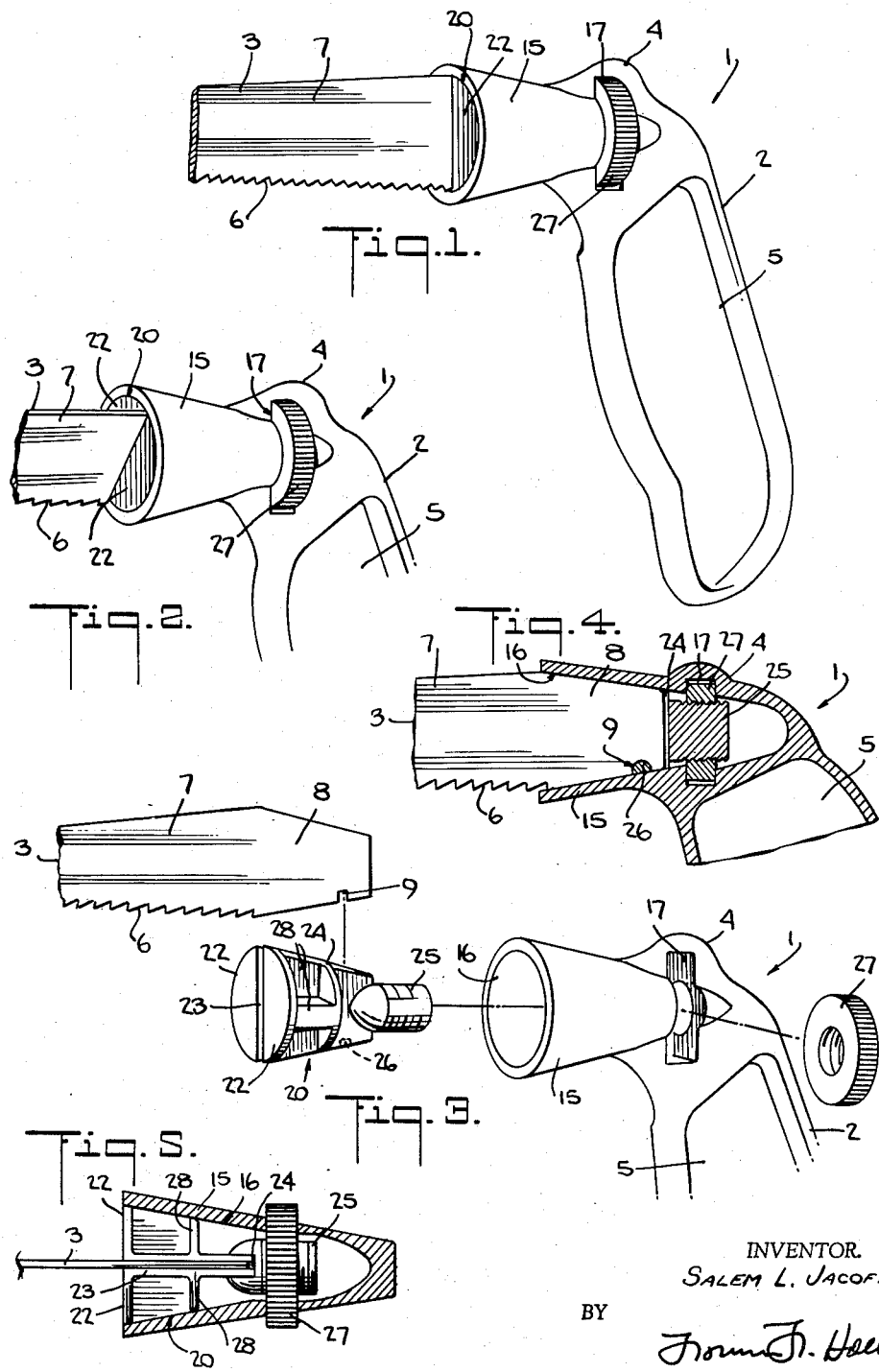
INVENTOR.
SALEM L. JACOFF
BY
ATTORNEY

United States Patent Office 3,114,402
Patented Dec. 17, 1963

3,114,402
SAW BLADE HOLDING MECHANISM
Salem L. Jacoff, Roslyn, N.Y., assignor to Great Neck Saw Manufacturers, Inc., Mineola, N.Y., a corporation of New York
Filed Dec. 18, 1961, Ser. No. 160,064
1 Claim. (Cl. 145—108)

The present invention relates to an improved hand saw and more particularly to an improved keyhole saw and to improved means for holding a keyhole saw blade in a handle.

Keyhole saws have been known for many years and generally comprise a tapered blade mounted at one end to a pistol-grip handle.

Many of the keyhole saws presently in use have means for permitting the saw blade to be rotated from a vertical plane to a plane at an angle with the vertical. However, such keyhole saws do not permit the saw blade to be rotated for a full 360° nor do they permit the saw blade to be moved in small angular increments. On the contrary, keyhole saws in use today have predetermined angled positions to which the blade may be moved, for example, 45° or 90° to the vertical and the position of the blade is restricted to these predetermined angular positions only.

Furthermore, the means for locking and unlocking the saw blade in such angular positions are rather complicated and some require complete dismantling of the saw blade.

The present invention overcomes these disadvantages and has for one of its objects the provision of an improved keyhole saw.

Another object of the present invention is the provision of an improved keyhole saw having improved means for holding saw blade on the handle.

Another object of the present invention is the provision of an improved keyhole saw wherein the saw blade may be easily moved from a vertical position to any desired angled position.

Another object of the present invention is the provision of an improved keyhole saw blade in which the saw blade can be moved to the desired angled position without dismantling of the blade holding means.

Another object of the present invention is the provision of an improved keyhole saw which is simple to operate and inexpensive to manufacture.

Other and further objects of the invention will be obvious upon an understanding of the illustrative embodiment about to be described or will be indicated in the appended claim, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a perspective view showing the keyhole saw in its normally operative position;

FIG. 2 is a perspective view similar to FIG. 1 showing the keyhole saw with its saw blade angled with respect to the vertical;

FIG. 3 is an exploded perspective view showing the means for holding the keyhole saw blade in place;

FIG. 4 is a side view in section of the keyhole saw showing the blade adjusting means in operative position; and FIG. 5 is a top view in section showing the blade holding means in operative position.

Referring more particularly to the drawings, the keyhole saw 1 made in accordance with the present invention comprises a handle 2 and a saw blade 3 extending therefrom. The handle has a hollow head portion 4 within which a blade-gripping chuck 20 is positioned and a depending grip portion 5 in the form of a pistol grip.

The saw blade 3 has the usual toothed edge 6 and is provided with the usual tapered front end 7. The rear end 8 of the blade is also tapered and is provided with a blade-holding notch 9 on its lower edge.

The head portion 4 is in the form of a rearwardly tapered hollow cylinder 15 having its inner walls 16 rearwardly tapered and communicating with a transverse nut-holding groove 17 which extends vertically in both directions from cavity 15.

Positioned within the cavity 15 is a blade-gripping chuck 20 which is generally tapered and comprises a pair of blade-clamping elements 22 pivotally mounted to each other at a pivot line 24 to define a blade-receiving channel 23. A threaded stud 25 integral with the blade-clamping elements 22 extends rearwardly and cooperatively engages threaded-adjusting nut 27 mounted in nut-holding groove 17. The adjusting nut 27 is preferably knurled and its diameter is greater than the width of head 4 so that its outer circumference extends beyond the head 4 to permit the fingers to grasp it for rotation. The rear lower edges of the two pivoted blade-clamping elements 22 has a blade-holding bead 26 extending across blade-receiving channel 23 adapted to cooperate with the notch 9 in the saw blade to hold the saw blade in the blade-receiving channel 23 and prevent longitudinal movement.

The blade-clamping elements 22 are provided with outwardly extending tapered ribs 28 to give the chuck 20 a generally tapered configuration. The general angular pitch of the tapered blade-gripping chuck 20 is slightly greater than the angular pitch of the tapered hollow cavity 15 so that when the blade-gripping chuck 20 is pulled inwardly by the rotation of the adjusting nut 27, the ribs 28 of the pivotally mounted blade-clamping elements 22 will bear against the inner walls 16 of the cavity 15 and be squeezed together around pivot 24 to grip the blade 3 tightly. Conversely, rotation of the adjusting nut 27 in opposite direction will move the chuck 20 outwardly to permit the blade-clamping elements 22 to move apart around pivot 24 and release the blade 3.

It will be noted that the blade-gripping chuck 20 is freely rotatable within the cavity 15 when the adjusting nut 27 is loosened so that the saw blade can be rotated to any desired position over a full 360° path. Thus the blade is also rotatable for a full 360° and hence can be placed in any desired position to give the best working angle.

The operation of the device is obvious from the above description. Assuming the position of the parts to be as shown in FIG. 4, except that a blade has not yet been mounted on the handle, the adjusting nut 27 is loosened so that it cooperates with the threaded rear stud 25 to move the chuck 20 outwardly. This will permit the inert resiliency of the chuck 20 to move both blade-clamping elements 22 apart (since they are no longer restrained by the inner walls 16 of the hollow cavity 15) to widen the blade-receiving channel 23. A blade 3 is then inserted in blade-receiving channel 23 of the chuck 20 with the notch 9 hooked behind the transverse pin or bead 26 so as to prevent the blade from being pulled off by the forward and rear movement of the keyhole saw in use. The adjusting nut 27 is then rotated in the opposite direction so that the chuck 21 is pulled inwardly within the cavity 15. The inner walls 16 of the cavity 15 will bear against the ribs 28 of the chuck 20 to squeeze the two blade-clamping elements 22 together around pivot 24 and against the blade 3 to securely hold the blade in place. The saw may now be used with the blade in a generally vertical position, as shown in FIG. 1.

However, when it is desired to rotate the blade 3 to an angled position, such as that shown in FIG. 2, it is necessary merely to rotate the adjusting nut 25 in the opposite direction so that the chuck 20 is moved outwardly slightly and hence is not restricted by the inner walls 16 of cavity 15 and is free to rotate. This permits the chuck 20, together with the blade 3, to be rotated to the desired angled position, such as the position shown in FIG. 2. When the desired position is reached, the adjusting nut 27 is tightened so that the chuck 20 is pulled back within the cavity 15 and the inner walls 16 of the cavity 15 bear against the ribs 28 on blade-clamping elements 22 to lock the chuck 20 and the blade 3 in the desired angled position.

It will thus been that with the present invention the keyhole saw may be easily attached and removed from the handle and may be easily placed in any desired angular position for a full 360° without dismantling the blade and without the use of special tools.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

A saw blade holding device comprising a handle having a frusto-conical cavity opening from a front end thereof and having a closed rear end with a transversely open chamber between said closed rear end and the rear end of said cavity, a blade holding chuck having a frusto-conical outer bearing surface complemental to the inner surface of the cavity and seated therein and having a blade-receiving slot opening from its front end and dividing the front portion of the chuck into two halves resiliently connected at their rear portion, a threaded member projecting from the rear end of the chuck and into the chamber of the handle, a transverse pin bridging said blade-receiving slot and adapted to interlock with a complemental notch in the rear end portion of a blade positioned in said slot, and a nut disposed in said chamber and threaded on said threaded member and bearing against the rear end of said cavity, whereby tightening said nut on said threaded member locks the chuck in the cavity in rotationally adjusted position therein and clamps the blade in the chuck.

References Cited in the file of this patent

UNITED STATES PATENTS

| 2,282,902 | Sultan | May 12, 1942 |
| 2,773,528 | Gringer | Dec. 11, 1956 |

FOREIGN PATENTS

| 81,838 | Norway | May 26, 1953 |
| 132,733 | Sweden | Aug. 21, 1951 |